United States Patent Office 3,752,824
Patented Aug. 14, 1973

3,752,824
THIOAMIDES
Aubert Yaucher Coran, Creve Coeur, Mo., and Joseph Edward Kerwood, St. Albans, W. Va., assignors to Monsanto Company, St. Louis, Mo.
No Drawing. Division of application Ser. No. 714,445, Mar. 20, 1968, now Patent No. 3,546,185, and a continuation-in-part of applications Ser. Nos. 549,730, May 12, 1966, 579,493, Sept. 15, 1966, and 459,466, May 27, 1965, all now abandoned. This application Mar. 27 1970, Ser. No. 29,717
Int. Cl. C07d 27/30
U.S. Cl. 260—326 S  16 Claims

ABSTRACT OF THE DISCLOSURE

Sulfenamides characterized by carbonyl adjacent to the sulfenamide nitrogen, the characteristic nucleus of which is

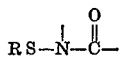

where the dangling valence on the nitrogen may be linked to a second carbonyl, alkyl, aryl, cycloalkyl, hydrogen, alkylene carbon, or arylene carbon, and R is alkyl, aryl, or cycloalkyl. The compounds, many of which are new, inhibit premature vulcanization of vulcanizable elastomers and stabilize styrene-butadiene rubber.

CROSS REFERENCES TO RELATED APPLICATIONS

This application is a division of application Ser. No. 714,445, filed Mar. 20, 1968, now U.S. 3,546,185, granted Dec. 8, 1970, a continuation-in-part of the application Ser. No. 579,493, filed Sept. 15, 1960, now abandoned, a continuation-in-part of the application Ser. No. 549,730, filed May 12, 1966, now abandoned, and a continuation-in-part of the application Ser. No. 459,466, filed May 27, 1965, now abandoned.

BACKGROUND OF THE INVENTION

This invention relates to an improved vulcanizing process for rubber and to the rubber stocks obtained by using this improved process. The invention relates to improved accelerator-inhibitor combinations for rubber. The invention also relates to new compounds useful as inhibitors of premature vulcanization in rubber. More particularly, the invention relates to a method for preventing the premature vulcanization of rubber stocks and to the rubber stocks obtained by using this method.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Bambury mixer or a mill. Scorching, viz, premature vulcanization, can occur at this stage of the processing, during the storage period befor vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art because thiazolesulfenamides delayed onset of the vulcanizing process, but once it started the built-in amine activation of the thiazole resulted in strong, rapid curing. Mercaptobenzothiazole is a valuable organic vulcanization accelerator but by present standards would be considered scorchy. It has been largely replaced by the delay-action accelerators, but further improvement has eluded the art. The development of high pH furnace blacks which lack the inherent inhibiting effect of the acidic channel blacks and the popularity of certain phenylenediamine antidegradants which promote scorching have placed increasingly stringent demands on the accelerator system.

Retarders have long been available to rubber compounders. These include N-nitrosodiphenylamine, salicyclic acid, and a terpene-resin acid blend. See Editors of Rubber World, "Compounding Ingredients for Rubber," 91–94 (3rd ed., 1961). Acids as retarders are generally ineffective with thiazolesulfenamide accelerators or adversely affect this vulcanizing process. Nitrosoamines as retarders are only of limited effectiveness with thiazolesulfenamides derived from primary amines. Certain sulfenamides which are not accelerators per se have been shown to retard mercaptobenzothiazole and other scorchy accelerators, but the effect on another sulfenamide incorporated as the primary accelerator has been marginal. Similarly, mixtures of accelerating sulfenamides have been proposed as a means of improving processing safety, but neither of these innovations has significantly improved a good delay-action accelerator.

Some of the inhibitors of the invention have vulcanizing and accelerating properties in their own right. For example, Belgian Pat. 619,219 (1962) to U.S. Rubber discloses N-[(trichloromethyl)thio]maleimide as a vulcanizing agent. The sulfur-vulcanizing agents, accelerators, and antidegradants used in the combinations of this invention do not include the inhibitors of the invention. A combination of an accelerator and an inhibitor of this invention. A combination of an accelerator and an inhibitor of this invention is an improved rubber additive which allows longer and safer processing time for rubber.

SUMMARY OF THE INVENTION

We have discovered a class of sulfenamides which are extremely valuable inhibitors of premature vulcanization. These are characterized by the presence of a carbonyl group adjacent to the sulfenamide nitrogen. The characteristic nucleus is

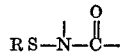

where the dangling valence on the nitrogen may be linked to a second carbonyl, alkyl, aryl, cycloalkyl, hydrogen, alkylene carbon, or arylene carbon and R is alkyl, aryl, or cycloalkyl. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the usual sense to mean univalent aliphatic radicals of the series $C_nH_{2n+1}$. Primary, secondary, and tertiary alkyls are included, for example, straight or branched chains. However, primary and secondary alkyl of 1 to 20 carbon atoms are the preferred alkyl compounds of this invention. The term cycloalkyl includes cycloalkyl radicals of 5 to 12 carbon atoms in the ring. Carbon atoms of the heterocyclic nuclei which contain hydrogen can be substituted by alkyl, alkoxy, nitro, chloro, bromo, fluoro, iodo, and hydroxy, for example, 1,3-bis(phenylthio)-5-chloro-2-benzimidazolinone.

An object of this invention is to promote the progress of science and useful arts. An object of this invention is to provide a method to effectively prevent the premature vulcanization of rubber. A further object of this invention is to provide new chemical compounds useful as premature vulcanization inhibitors especially with delayed-action thiazolesulfenamides. A further object of this invention is to provide a method for a faster rate of cure for vulcanizable rubber without premature vulcanization. A further object of this invention is to provide a method to increase the available processing time prior to the actual vulcanization of rubber. A further object of this invention is to provide a method to prevent the premature vulcanization of crude rubber in storage containing a vulcanizing and accelerating agent. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide a stabilizer for rubber. A further object of this invention is to provide new and improved vulcanized rubber products. A further object of this invention is to provide a vulcanized rubber stock in which the rate of reversion is reduced. Other objects of the invention will become apparent as the description of our invention proceeds. These objects are accomplished by using a sulfenamide derived from an amide or imide in the processing of rubber.

DESCRIPTION OF THE PREFERRED EMBODIMENTS

Our invention is that compounds having the formula

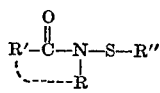

are excellent premature vulcanization inhibitors for a vulcanizable diene rubber where R and R' with the carbonyl and nitrogen atom constitute a radical, for example, N-phthalimidyl,
N-succinimidyl,
N-adipimidyl,
N-glutarimidyl,
N-3,3-dimethylglutarimidyl,
N-hexahydrophthalimidyl,
7-oxabicyclo[2.2.1]heptane-2,3-dicarboximid-N-yl,
7-oxabicyclo[2.2.1]hept-5-ene-2,3-dicarboximid-N-yl,
tetrapropenylsuccinimid-N-yl,
methylsuccinimid-N-yl,
octadecylsuccinimid-N-yl,
n-decenylsuccinimid-N-yl,
1,4,5,6,7,7-hexachlorobicyclo[2.2.1]hept-5-ene-2,3-dicarboximid-N-yl,
5,5-dimethyl-3-hydantoinyl,
hydantoinyl,
5,5-diphenyl-3-hydantoinyl,
N-maleimidyl,
4-cyclohexene-1,2-dicarboximid-N-yl,
2-benzimidazolinon-1-yl,
2-benzothiazolinon-N-yl,
3-arylthio-2-benzimidazolinon-1-yl,
3-alkylthio-2-benzimidazolinon-1-yl,
3-cycloalkylthio-2-benzimidazolinon-1-yl,
2-imidazolinon-1-yl,
3-cycloalkylthio-2-imidazolinon-1-yl,
3-arylthio-2-imidazolinon-1-yl,
3-alkylthio-2-imidazolinon-1-yl,
2-imidazolidinon-1-yl,
3-cycloalkylthio-2-imidazolidinon-1-yl,
3-arylthio-2-imidazolidinon-1-yl,
3-alkylthio-2-imidazolidinon-1-yl,
bicyclo[2.2.1]hept-5-ene-2,3-dicarboximid-N-yl,
alkylbicyclo[2.2.1]hept-5-ene-2,3-dicarboximid-N-yl,
N-(arylthio)-1,2,4,5-benzenetetracarboxylic-1,2:4,5-diimid-N'-yl,
N-(cycloalkylthio)-1,2,4,5-benzenetetracarboxylic-1,2:4,5-diimid-N'-yl,
N-(alkylthio)-1,2,4,5-benzenetetracarboxylic-1,2:4,5-diimid-N'-yl,
N-naphthalimidyl, or
N-(3,4,5,6-tetrahalophthalimidyl), and
R" is alkyl, aryl, or cycloalkyl.

More specific examples of R" are $CCl_3$, methyl, ethyl, propyl, isopropyl, butyl, amyl, t-butyl, phenyl, benzyl, chlorophenyl, nitrophenyl, tolyl, naphthyl, cyclooctyl, cyclopentyl, and cyclododecyl.

The premature vulcanization inhibitors of this invention include compounds of the formula

where

constitutes a radical, for example,

N-(arylthio)carbamoyl,
N-(cycloalkylthio)carbamoyl,
N-(alkylthio)carbamoyl,
N-arylcarbamoyl,
N-alkylcarbamoyl, and
N-cycloalkylcarbamoyl, and R' is alkyl, aryl, or cycloalkyl. More specific examples of

are

N-(chlorophenylthio)carbamoyl,
N-(chlorophenylthio)carbamoyl,
N-(benzylthio)carbamoyl,
N-(tolylthio)carbamoyl,
N-(methylthio)carbamoyl,
N-(ethylthio)carbamoyl,
N-(propylthio)carbamoyl,
N-(isopropylthio)carbamoyl,
N-(t-butylthio)carbamoyl,
N-phenylcarbamoyl,
N-methylcarbamoyl,
N-ethylcarbamoyl,
N-propylcarbamoyl,
N-isopropylcarbamoyl,
N-t-butylcarbamoyl,
N-trichloromethylcarbamoyl,
N-benzylcarbamoyl,
N-nitrophenylcarbamoyl,
N-chlorophenylcarbamoyl, and
N-tolylcarbamoyl, and more specific examples of R' are methyl, ethyl, propyl, isopropyl, t-butyl, trichloromethyl, phenyl, benzyl, chlorophenyl, tolyl, nitrophenyl, naphthyl, sec. butyl, n-butyl, n-amyl, n-hexyl, n-heptyl, 2-ethylhexyl, n-octyl, n-decyl, n-undecyl, n-dodecyl, n-tridecyl, o-tolyl, p-tolyl, m-tolyl, p-ethylphenyl, p-isopropylphenyl, cyclooctyl, cyclopentyl, and cyclododecyl.

N-(cyclohexylthio)adipimide,

N-cyclopentylthio)adipimide,
N-(cyclododecylthio)adipimide,
N-(cyclocetylthio)adipimide,
N-(benzylthio)adipimide,
N-(methylthio)adipimide,
N-(ethylthio)adipimide,
N-(propylthio)adipimide,
N-isopropylthio)adipimide,
N-(n-butylthio)adipimide,
N-(t-butylthio)adipimide,
N-(isobutylthio)adipimide,
N-(sec.-butylthio)adipimide,
N-(n-pentylthio)adipimide,
N-(n-heptylthio)adipimide,
N-(n-hexylthio)adipimide,
N-(n-octylthio)adipimide,
N-(n-dodecylthio)adipimide,
N-(phenylthio)adipimide,
N-(tolylthio)adipimide,
N-(cyclohexylthio)glutarimide,
N-(cyclooctylthio)glutarimide,
N-(cyclopentylthio)glutarimide,
N-(cyclododecylthio)glutarimide,
N-(benzylthio)glutarimide,
N-(methylthio)glutarimide,
N-(ethylthio)glutarimide,
N-(propylthio)glutarimide,
N-(isopropylthio)glutarimide,
N-(n-butylthio)glutarimide,
N-(t-butylthio)glutarimide,
N-(isobutylthio)glutarimide,
N-(sec.-butylthio)glutarimide,
N-(n-pentylthio)glutarimide,
N-(n-heptylthio)glutarimide,
N-(n-hexylthio)glutarimide,
N-(n-octylthio)glutarimide,
N-(n-dodecylthio)glutarimide,
N-(phenylthio)glutarimide,
N-(tolylthio)glutarimide,
N-cyclohexylthio)-3,3-dimethylglutarimide,
N-(cyclooctylthio)-3,3-dimethylglutarimide,
N-(cyclopentylthio)-3,3-dimethylglutarimide,
N-(cyclododecylthio)-3,3-dimethylglutarimide,
N-(benzylthio)-3,3-dimethylglutarimide,
N-(methylthio)-3,3-dimethylglutarimide,
N-(ethylthio)-3,3-dimethylglutarimide,
N-(propylthio)-3,3-dimethylglutarimide,
N-(isopropylthio)-3,3-dimethylglutarimide,
N-(n-butylthio)-3,3-dimethylglutarimide,
N-(t-butylthio)-3,3-dimethylglutarimide,
N-(isobutylthio)-3,3-dimethylglutarimide,
N-(sec.-butylthio)-3,3-dimethylglutarimide,
N-(n-pentylthio)-3,3-dimethylglutarimide,
N-(n-heptylthio)-3,3-dimethylglutarimide,
N-(n-hexylthio)-3,3-dimethylglutarimide,
N-(n-octylthio)-3,3-dimethylglutarimide,
N-(n-dodecylthio)-3,3-dimethylglutarimide,
N-(phenylthio)-3,3-dimethylglutarimide,
N-(tolylthio)-3,3-dimethylglutarimide,
N-(cyclohexylthio)-7-oxabicyclo[2.2.1]heptane-2,3-dicarboximide,
N-(cyclohexylthio)-7-oxabicyclo[2.2.1]hept-5-ene-2,3-dicarboximide,
N-(cyclohexylthio)hexahydrophthalimide,
N,N'-di(phenylthio)urea,
N,N'-di(cyclohexylthio)urea,
N,N'-di(cyclooctylthio)urea,
N,N'-di(chlorophenylthio)urea,
N,N'-di(benzylthio)urea,
N,N'-di(tolylthio)urea,
N,N'-di(t-butylthio)urea,
N,N'-di(methylthio)urea,
N,N'-di(ethylthio)urea,
N,N'-di(propylthio)urea,
N,N'-di(isopropylthio)urea,
N,N'-di(n-dodecylthio)urea,
N-(cyclohexylthio)maleimide,
N-(cyclooctylthio)maleimide,
N-(phenylthio)maleimide,
N-(chlorophenylthio)maleimide,
N-tolylthio)maleimide,
N-(nitrophenylthio)maleimide,
N-(benzylthio)maleimide,
N-(t-butylthio)maleimide,
N-(methylthio)maleimide,
N-(ethylthio)maleimide,
N-(propylthio)maleimide,
N-(isopropylthio)maleimide,
N-(n-dodecylthio)maleimide,
cyclohexylthio-3-hydantoin,
1,3-bis(cyclohexylthio)hydantoin,
cyclooctylthio)-3-hydantoin,
1,3-bis(cyclooctylthio)hydantoin,
cyclopentylthio-3-hydantoin,
1,3-bis(cyclopentylthio)hydantoin,
cyclododecylthio-3-hydantoin,
1,3-bis(cyclododecylthio)hydantoin,
phenylthio-3-hydantoin,
1,3-bis(phenylthio)hydantoin,
chlorophenylthio-3-hydantoin,
1,3-bis(chlorophenylthio)hydantoin,
benzylthio-3-hydantoin,
1,3-bis(benzylthio)hydantoin,
tolylthio-3-hydantoin,
1,3-bis(tolylthio)hydantoin,
methylthio-3-hydantoin,
1,3-bis(methylthio)hydantoin,
ethylthio-3-hydantoin,
1,3-bis(ethylthio)hydantoin,
propylthio-3-hydantoin,
1,3-bis(propylthio)hydantoin,
isopropylthio-3-hydantoin,
1,3-bis(isopropylthio)hydantoin,
dodecylthio-3-hydantoin,
1,3-bis(dodecylthio)hydantoin,
5,5-dimethyl-3-(cyclohexylthio)hydantoin,
5,5-dimethyl-3-(cyclooctylthio)hydantoin,
5,5-dimethyl-3-(phenylthio)hydantoin,
5,5-dimethyl-3-(chlorophenylthio)hydantoin,
5,5-dimethyl-3-(benzylthio)hydantoin,
5,5-dimethyl-3-(tolylthio)hydantoin,
5,5-dimethyl-3-(nitrophenylthio)hydantoin,
5,5-dimethyl-3-(t-butylthio)hydantoin,
5,5-dimethyl-3-(methylthio)hydantoin,
5,5-dimethyl-3-(ethylthio)hydantoin,
5,5-dimethyl-3-(propylthio)hydantoin,
5,5-dimethyl-3-(isopropylthio)hydantoin,
5,5-dimethyl-3-(n-dodecylthio)hydantoin,
1,4,5,6,7,7-hexachloro-N-(cyclohexylthio)bicyclo-[2.2.1]hept-5-ene-2,3-dicarboximide,
1,4,5,6,7,7-hexachloro-N-(cyclooctylthio)bicyclo-[2.2.1]hept-5-ene-2,3-dicarboximide,
1,4,5,6,7,7-hexachloro-N-(cyclooctylthio) bicyclo[2.2.1]hept-5-ene-dicarboximide,
1,4,5,6,7,7-hexachloro-N-(phenylthio)bicyclo-[2.2.1]hept-5-ene-2,3-dicarboximide,
1,4,5,6,7,7-hexachloro-N-(chlorophenylthio)bicyclo-[2.2.1]hept-5-ene-2,3-dicarboximide,
1,4,5,6,7,7-hexachloro-N-(benzylthio)bicyclo[2.2.1]hept-5-ene-2,3-dicarboximide,
1,4,5,6,7,7-hexachloro-N-(tolylthio)bicyclo[2.2.1]hept-5-ene-2,3-dicarboximide,
1,4,5,6,7,7-hexachloro-N-(nitrophenylthio)bicyclo-[2.2.1]hept-5-ene-2,3-dicarboximide,
1,4,5,6,7,7-hexachloro-N-(t-butylthio)bicyclo[2.2.1]hept-5-ene-2,3-dicarboximide,
1,4,5,6,7,7-hexachloro-N-(methylthio)bicyclo[2.2.1]hept-5-ene-2,3-dicarboximide,
1,4,5,6,7,7-hexachloro-N-(ethylthio)bicyclo[2.2.1]hept-5-ene-2,3-dicarboximide, N-(propylthio)bicyclo[2.2.1]hept-5-ene-2,3-dicarboximide,
1,4,5,6,7,7-hexachloro-N-(isopropylthio)bicyclo-[2.2.1]hept-5-ene-2,3-dicarboximide,
1,4,5,6,7,7-hexachloro-N-(n-dodecylthio)bicyclo[2.2.1]hept-5-ene-2,3-dicarboximide,
N-(cyclohexylthio)-4-cyclohexene-1,2-dicarboximide,
N-(cyclooctylthio)-4-cyclohexene-1,2-dicarboximide,
N-(phenylthio)-4-cyclohexene-1,2-dicarboximide,
N-(chlorophenylthio)-4-cyclohexene-1,2-dicarboximide,
N-(benzylthio)-4-cyclohexene-1,2-dicarboximide,
N-(tolylthio)-4-cyclohexene-1,2-dicarboximide,
N-(nitrophenylthio)-4-cyclohexene-1,2-dicarboximide,
N-(t-butylthio)-4-cyclohexene-1,2-dicarboximide,
N-(methylthio)-4-cyclohexene-1,2-dicarboximide,
N-(ethylthio)-4-cyclohexene-1,2-dicarboximide,
N-(propylthio)-4-cyclohexene-1,2-dicarboximide,
N-(n-dodecylthio)-4-cyclohexene-1,2-dicarboximide,
N-(isopropylthio)-4-cyclohexene-1,2-dicarboximide, and
N,N'-bis(ar-tolylthio)-1,2,4,5-benzenetetracarboxylic-1,2:4,5-diimide.

Further examples of the compounds useful as premature vulcanization inhibitors in this invention are N-(naphthylthio)phthalimide,
N-(n-butylthio)succinimide,
N-(methylthio)succinimide,
N-(ethylthio)succinimide,
N-(propylthio)succinimide,
N-(isopropylthio)succinimide,
N-(cyclohexylthio)succinimide, and
N-(cyclooctylthio)succinimide;
1,3-bis(n-hexylthio)-1,3-dicyclohexyl-urea,
N-phenyl-N'-(phenylthio)urea,
N-phenyl-N'-(methylthio)urea,
N-(phenyl-N'-(ethylthio)urea,
N-phenyl-N'-(propylthio)urea,
N-phenyl-N'-(isopropylthio)urea,
N-phenyl-N'-(t-butylthio)urea,
N-phenyl-N'-(n-dodecylthio)urea,
N-phenyl-N'-(cyclohexylthio)urea,
N-phenyl-N'-(cyclooctylthio)urea,
N-methyl-N'-(phenylthio)urea,
N-ehtyl-N'-(phenylthio)urea,
N-propyl-N'-(phenylthio)urea,
N-isopropyl-N'-(phenylthio)urea,
N-t-butyl-N'-(phenylthio)urea,
N-cyclooctyl-N'-(phenylthio)urea,
N-cyclohexyl-N'-(phenylthio)urea,
N-n-dodecyl-N'-(phenylthio)urea, and variations thereof; and
N-(cyclododecylthio)succinimide.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, peroxide-vulcanizing agents, organic accelerators for vulcanization, and antidegradants, none being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexylsulfenamide, 2 - mercaptobenzothiazole, N-tert-butyl - 2 - benzothiazole sulfenamide, 2-benzothiazolyl diethyldithiocarbamate, and 2 - (morpholinothio) benzothiazole can be used. Amine salts of mercaptobenzothiazole accelerators, for example, the t-butyl amine salt of mercaptobenzothiazole, like salts of morpholine, and 2,6-dimethyl morpholine, can be used in the invention. Thiazole accelerators other than aromatic can be used. Stocks containing accelerators, for example, the tetramethylthiuram disulfide, tetramethylthiuram monosulfide, aldehyde amine condensation products, thiocarbamylsulfenamides, thioureas, xanthates, and guanidine derivatives, are substantially improved using the process of our invention. Examples of thiocarbamylsulfenamide accelerators are shown in U.S. Pats. 2,381,392, Smith assigned to Firestone, 2,388,236, Cooper assigned to Monsanto, 2,424,921, Smith assigned to Firestone, and Britain Pat. 880,912, Dodson assigned to Imperial Chemical Industries Limited. The invention is applicable to accelerator mixtures. The invention is applicable to stocks containing amine antidegradants. Rubber mixes containing antidegradants, for example, N-1,3-dimethylbutyl-N'-phenyl-p-phenylenediamine, N,N' - bis(1,4 - dimethylpentyl)-p-phenylenediamine, and other phenylenediamines, ketone, ether, and hydroxy antidegradants and mixtures thereof, are substantially improved using the process of our invention. Mixtures of antidegradants, for example, a mixture of N-1,3-dimethylbutyl-N'-phenyl - p - phenylenediamine and N,N'-bis(1,4 - dimethylpentyl)-p-phenylenediamine, furnish a much improved final product when used with the inhibitors of this invention.

The inhibitors of our invention can be used in natural and synthetic rubbers and mixtures thereof. Synthetic rubbers that can be improved by the process of this invention include cis-4-polybutadiene, butyl rubber, ethylenepropylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubber and diene rubber are synonymous for the purpose of this invention.

The new compounds of this invention are prepared as follows:

To prepare N,N'-di(phenylthio)urea, a solution of 6.0 grams (0.1 mole) of urea and 25.0 grams (0.25 mole) of triethylamine in 200 ml. of DMF is cooled to $-10°$ C. in a three-necked 500 ml. flask equipped with a mechanical stirrer and thermometer. To this solution is added slowly 28.8 grams (0.2 mole) of benzene sulfenyl chloride dissolved in 77 ml. carbon tetrachloride. During the addition the temperature is allowed to increase to 5° C. and a slurry of the triethylamine salt forms. This slurry is transferred to a 4.0 liter beaker and the product is precipitated by the addition of 3.0 liters of ice water with vigorous stirring. The brown solid is collected by filtration and upon recrystallization from ethanol yields a tan powder which melts at 104°–105° C. Analysis of the product shows 9.58% nitrogen and 23.13% sulfur. Calculated percentages for $C_{13}H_{12}N_2OS_2$ are 9.60% nitrogen and 22.00% sulfur. The infrared spectrum is consistent with the proposed structure. The new ureas listed, supra, are prepared in a similar manner with comparable results.

N-(phenylthio)maleimide is prepared in the following manner: 14.4 grams of benzene sulfenyl chloride is added slowly at 15°–20° C. to a mixture of 9.8 grams (0.1 mole) of maleimide and 20.0 grams (0.2 mole) of triethylamine dissolved in 200 ml. of dry benzene in a three-necked 500 ml. reaction flask equipped with a mechanical stirrer and thermometer. The reaction mixture is allowed to stir until it reaches room temperature. This requires about 30 minutes. The triethylamine salt is collected by filtration, and the cake is washed with 100 ml. of benzene. The filtrate is evaporated under reduced pressure until the product starts to precipitate from solution. The slurry is transferred to a 4.0 liter beaker and 3.0 liters of heptane is added with vigorous stirring. This precipitates the remaining product which is collected by filtration and washed with cold heptane. The product is allowed to dry overnight at room temperature. There is obtained 12.0 grams of product which, upon recrystallization from ethanol, has a melting point of 81°–82° C. The infrared spectrum is consistent with the proposed structure. The new maleimides listed, supra, are prepared in a similar manner with comparable results.

N - (phenylthio) - 4 - cyclohexene-1,2-dicarboximide is prepared in the following manner: 14.4 grams (0.1 mole) of benzene sulfenyl chloride dissolved in 30.0 grams of carbon tetrachloride is added slowly to a mixture of 14.9 grams (0.1 mole) of 4-cyclohexene-1,2-dicarboximide and 12.0 grams (0.12 mole) of triethylamine in 250 ml. of benzene at 15° C. in a 500 ml. three-necked flask equipped with a stirrer and thermometer. The temperature is controlled at 15° C. with external cooling during the addition of the benzene sulfenyl chloride. The reaction is then allowed to warm to room temperature and the triethylamine salt is removed by filtration, washed with a small amount of benzene and 200 ml. of heptane is added to the filtrate to precipitate the product. The benzene and heptane are removed under reduced pressure. There is obtained 25.2 grams of a white solid which melts at 105°–108° C. The product is recrystallized from carbon tetrachloride and has a melting point of 121°–122.5° C. Analysis shows 5.29% nitrogen and 11.69% sulfur. Calculated percentages for $C_{14}H_{13}NO_2S$ are 5.42% nitrogen and 12.39% sulfur. The new 4-cyclohexene-1,2-dicarboximides listed, supra, are prepared in a similar manner with comparable results.

The new 5,5-dimethylhydantoins and 1,4,5,6,7,7-hexachlorobicyclo[2.2.1] hept-5-ene-2,3-dicarboximides listed, supra, are prepared in a similar manner to N-(phenylthio)-4-cyclohexene-1,2-dicarboximide with comparable results.

N - (phenylthio)bicyclo[2.2.1] hept - 5-ene-2,3-dicarboximide is prepared in the following manner: To a mixture of 16.3 grams (0.1 mole) of the imide of bicyclo-[2.2.1] hept-5-ene-2,3-dicarboxylic anhydride and 11.1 grams (0.11 mole) of triethylamine in 300 ml. of benzene, there is added dropwise with stirring 0.105 mole of benzene sulfenyl chloride as a carbontetrachloride solution over a 30 minute period. The temperature of the mixture is maintained at 30° C. during the addition. The reaction mixture is stirred an additional 10 minutes after the sulfenyl chloride solution is added. The reaction mixture is filtered to remove triethylamine hydrochloride and the filtrate is added to 3.5 liters of chilled heptane. A white solid is obtained weighing 17.6 grams. A sample of the N - (phenylthio)-bicyclo[2.2.1] hept-5-ene-2,3-dicarboximide melts at 123°–125° C. Analysis shows 5.37% nitrogen and 11.09% sulfur. Calculated percentages for $C_{15}H_{13}NO_2S$ are 5.16% nitrogen and 11.80% sulfur. N-phenylthionaphthalimide, N - phenylthio - 3,4,5,6 - tetrachlorophthalimide, N - phenylthio - 3,4,5,6 - tetrabromophthalimide, and similar compounds are prepared in a similar manner to N-(phenylthio)-bicyclo[2.2.1] hept-5-ene-2,3-dicarboximide with comparable results.

N,N' - bis(phenylthio) - 1,2,3,4 - benzenetetracarboxylic-1,2:4,5-diimide is prepared in the following manner: To a solution of 21.6 grams (9.1 moles) of pyromellitic bis-dicarboximide and 22.2 grams (0.22 mole) of triethylamine in 300 ml. of dimethylformamide, there is added dropwise with stirring 0.21 mole of benzene sulfenyl chloride as a carbontetrachloride solution. The temperature is maintained at 20° to 30° C. Three liters of ice water is added to the resulting slurry to precipitate the product. The N,N'-bis(phenylthio)-1,2,4,5-benzenetetracarboxylic-1,2:4,5-diimide product is a yellow solid. A sample of the product melts at 260° C. Analysis of the product shows 6.05% nitrogen and 14.60% sulfur. Calculated percentages for $C_{22}H_{12}N_2O_4S_2$ are 6.48% nitrogen and 14.82% sulfur. N,N'-bis(ar-tolythio)-1,2,4,5-benzenetetracarboxylic-1,2:4,5-diimide and similar compounds are prepared in a similar manner with comparable results.

N-(cyclohexylthio)glutarimide is prepared in the following manner: Twenty grams (0.177 mole) of glutarimide is added in one portion to a mixture of 24 grams (0.24 mole) of triethylamine and 200 ml. of dimethylformamide. To the resulting solution, 26.5 grams (0.177 mole) of cyclohexylsulfenyl chloride dissolved in 150 ml. of n-pentane is added dropwise over a 30 minute period. The temperature of the reaction increases from about 23° C. to 40° C. during the addition. The resulting slurry is stirred for an additional 30 minutes and then transferred to a 3.0 liter beaker. Two liters of cold water is then added to the slurry with vigorous stirring, and a light tan precipitate is formed. The solid is collected by filtration and allowed to dry at room temperature. The tan solid is recrystallized twice from heptane to yield long white needles which melt at 83°–85° C. Analysis of the product shows 13.70% sulfur and 6.02% nitrogen. Calculated percentages for $C_{11}H_{17}NO_2S$ are 14.13% sulfur and 6.16% nitrogen.

Other glutarimides and 3,3-dimethylglutarimide compounds of this invention are prepared in a similar manner with comparable results. Analysis of N-(cyclohexylthio)-3,3-dimethylglutarimide shows 12.25% sulfur and 5.34% nitrogen. Calculated percentages for $C_{13}H_{21}NO_2S$ are 12.57% sulfur and 5.5% nitrogen.

The following tables illustrate the invention in greater detail and the best mode for carrying it out, but are not to be construed as to narrow the scope of our invention. For all the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto Oscillating Disc Rheometer described by Decker, Wise, and Guerry in Rubber World, December 1962, page 68. From the Rheometer data, R.M.T. is the maximum torque in Rheometer units, $t_3$ or $t_2$ is the time in minutes for a rise of three or two Rheometer units, respectively, above the minimum reading and $t_{90}$ is the time required to obtain a torque 90% of the maximum.

The trademarks of some compounds used in the practice of this invention are Santocure MOR, Santoflex 77, Santocure NS, DPG, Thiofide, and Vultrol. Santocure MOR is the accelerator 2-(morpholinothio)benzothiazole. Santoflex 77 is the antidegradant N,N'-bis(1,4-dimethylpentyl)-p-phenylenediamine. Santocure NS is the accelerator N-tert-butyl-2-benzothiazolesulfenamide. DPG is an accelerator reported to be diphenylguanidine. Thiofide is an accelerator reported to be benzothiazyl disulfide. Vultrol is a vulcanization retarder reported to be N-nitrosodiphenylamine.

Table I illustrates the results of using N-(phenylthio)succinimide and N-(benzylthio)succinimide as premature vulcanization inhibitors in stocks of natural rubber containing the antioxidant Santoflex 77 and the accelerator Santocure MOR. From the data of Table I it will be noted that N-(phenylthio)succinimide and N-(benzylthio)succinimide are quite active in the presence of the accelerator as premature vulcanization inhibitors. From the intermittent ozone test, there appears to be no effect on the ozone resistance of the vulcanizates containing the inhibitors.

TABLE I

| Stock | A | B | C |
|---|---|---|---|
| Natural rubber | 100 | 100 | 100 |
| High abrasion furnace black | 50 | 50 | 50 |
| Zinc oxide | 5 | 5 | 5 |
| Stearic acid | 3 | 3 | 3 |
| Hydrocarbon softener | 10 | 10 | 10 |
| Sulfur | 2.5 | 2.5 | 2.5 |
| Santoflex 77 | 3 | 3 | 3 |
| Santocure MOR | 0.5 | 0.5 | 0.5 |
| N-(phenylthio)succinimide |  | 1.0 |  |
| N-(benzylthio)succinimide |  |  | 1.0 |
| $t_5$ | 20.8 | 44.0 | 40.6 |
| $t_{35-5}$ | 4.1 | 4.6 | 4.5 |
| Percent increase in scorch delay |  | 111 | 95 |
| Shore A hardness | 58 | 60 | 58 |
| Modulus 300, p.s.i. | 1900 | 1930 | 1930 |
| Ultimate tensile strength, p.s.i. | 3600 | 3600 | 3600 |
| Ultimate elongation, percent | 490 | 490 | 480 |
| Rheometer at 144° C.: |  |  |  |
| $t_3$ | 7.2 | 13.3 | 14.0 |
| $t_{90}$ | 19.0 | 26.2 | 26.8 |
| $k_1$[1] | .025 | .005 |  |
| $k_2$ | .173 | .173 | .165 |
| Intermittent ozone:[2] |  |  |  |
| Hours 90% retention | 16 | 13 | 15 |
| Hours 80% retention | 31 | 30 | 32 |

[1] $k$ is a specific rate constant measured in reciprocal minutes. See Coran, 37 Rubber Chemistry and Technology 689 (1964).
[2] For method see Decker & Wise, Rubber World, April 1962, p. 66.

In Table II it is shown that N-(phenylthio)succinimide functions as an inhibitor in natural rubber with Santocure NS as well as it did with the accelerator Santocure MOR. It is also shown in Table II that 0.25 part per hundred N-

TABLE II

| Stock | 1 | 2 | 3 | 4 | 5 | 6 | 7 | 8 | 9 | 10 | 11 | 12 |
|---|---|---|---|---|---|---|---|---|---|---|---|---|
| Mooney scorch at 121° C.: $t_5$ | 20.3 | 28.0 | 23.9 | 27.5 | 32.7 | 43.0 | 40.6 | 48.6 | 37.6 | 47.4 | 56.0 | 70.5 |
| Percent increase in scorch delay |  | 38.0 |  | 11.0 | 37.0 | 80.0 |  | 20.0 |  | 26.0 | 49.0 | 88.0 |
| Rheometer at 144° C.: |  |  |  |  |  |  |  |  |  |  |  |  |
| $t_3$ | 7.5 | 9.6 | 8.2 | 9.2 | 10.8 | 12.4 | 10.2 | 12.7 | 10.8 | 12.8 | 15.3 | 17.5 |
| $t_{90}$ | 18.7 | 20.8 | 19.0 | 21.0 | 21.5 | 23.2 | 23.8 | 27.0 | 23.0 | 25.0 | 28.5 | 31.0 |
| $k_1$ | .025 | .007 | .026 | .020 | .016 | .099 | .013 | .002 | .017 | .009 | .005 | .003 |
| $k_2$ | .183 | .216 | .178 | .173 | .173 | .183 | .154 | .210 | .150 | .165 | .165 | .168 |

(phenylthio)succinimide with Santocure NS has about the same vulcanization characteristics as 1.0 part per hundred of the well-known retarder Vultrol with Santocure MOR. It is shown that increasing concentrations of N-(phenylthio)succinimide with Santocure NS does not inhibit the rate of crosslink formation as measured by the specific rate constant $k_2$. The parameter $k_2$ is actually increased with increasing amounts of N-(phenylthio)succinimide in the presence of the phenylenediamine antidegradants. Stocks containing N-(phenylthio)succinimide and Santocure NS also show an excellent rate of cure after the onset of vulcanization.

The code for Table II is as follows. The stocks contain:

| | Parts |
|---|---|
| Natural rubber | 100 |
| High abrasion furnace black | 50 |
| Zinc oxide | 5 |
| Stearic acid | 3 |
| Hydrocarbon softener | 3 |
| Antidegradant | 3 |
| Accelerator | 0.5 |
| Premature vulcanization inhibitor | As indicated |
| Sulfur | 2.5 |

Twelve stocks were tested. The stocks include the following:

Stock No.:
1 _____ Santocure MOR+Santoflex 77.
2 _____ Santocure MOR+Santoflex 77+Vultrol (1.0 part).
3 _____ Santocure NS+Santoflex 77.
4 _____ Santocure NS+Santiflex 77+N-(phenylthio)succinimide (0.25 part).
5 _____ Santocure NS+Santoflex 77+N-(phenylthio)succinimide (0.5 part).
6 _____ Santocure NS+Santoflex 77+N-(phenylthio)succinimide (1.0 part).
7 _____ Santocure MOR+N-1,3-dimethylbutyl-N'-phenyl-p-phenylenediamine.
8 _____ Santocure MOR+N-1,3-dimethylbutyl-N'-phenyl - p - phenylenediamine+Vultrol (1.0 part).
9 _____ Santocure NS+N - 1,3 - dimethylbutyl-N'-phenyl-p-phenylenediamine.
10 _____ Santocure NS+N - 1,3 - dimethylbutyl-N'-phenyl - p-phenylenediamine+N-(phenylthio)succinimide (0.25 part).
11 _____ Santocure NS+N - 1,3 - dimethylbutyl-N'-phenyl - p-phenylenediamine+N-(phenylthio)succinimide (0.5 part).
12 _____ Santocure NS+N - 1,3 - dimethylbutyl-N'-phenyl - p-phenylenediamine+N-(phenylthio)succinimide (1.0 part).

Results comparable to the natural rubber preparations of Table II are obtained using cis-4-polybutadiene, butyl rubber, ethylenepropylene terpolymers, polymers of 1,3-butadiene, for example, 1,3-butadiene itself and of isoprene and copolymers of 1,3-butadiene with other monomers, for example, styrene, acrylonitrile, isobutylene, and methyl methacrylate as the base stock and N-(phenylthio)succinimide and N-(benzylthio)succinimide as the inhibitor. For example, Table III shows the premature vulcanization inhibitor properties of N-(phenylthio)succinimide in a styrene-butadiene rubber B–5 masterbatch. The compound is compared with Vultrol in several systems. The code for Table III is as follows. A B–5 masterbatch is composed of:

| | Parts |
|---|---|
| Oil-extended styrene-butadiene rubber containing 37.5% highly aromatic oil | 137.5. |
| Intermediate super Abrasion furnace black | 68.5. |
| Zinc oxide | 3.0. |
| Stearic acid | 2.0. |

The stocks also contain:

| | |
|---|---|
| Antidegradant N-1,3-dimethylbutyl - N' - phenyl-p-phenylenediamine | 3.0. |
| Premature vulcanization inhibitor | As indicated below. |
| Accelerator | 1.2 or as indicated below. |
| Sulfur | 2.0. |

Ten stocks were tested. The stocks include the following:

Stock No.:
1 _____ Santocure MOR.
2 _____ Santocure NS.
3 _____ Vultrol (1.0 part)+Santocure MOR.
4 _____ Vultrol (1 part)+Santocure NS.
5 _____ N-(phenylthio)succinimide (0.25 part)+Santocure NS.
6 _____ N-(phenylthio)succinimide (0.5 part)+Santocure NS.
7 _____ N-(phenylthio)succinimide (1 part)+Santocure NS.
8 _____ N-(phenylthio)succinimide (1 part)+Santocure MOR.
9 _____ Benzothiazyl disulfide (1 part)+diphenylguanidine (0.7 part).
10 _____ N - (phenylthio)succinimide (1 part)+benzothiazyl disulfide (1 part)+diphenylguanidine (0.7 part).

TABLE III

| Stock | 1 | 2 | 3 | 4 | 5 | 6 | 7 | 8 | 9 | 10 |
|---|---|---|---|---|---|---|---|---|---|---|
| Mooney scorch at 135° C.: $t_5$ | 26.9 | 20.6 | 30.0 | 20.8 | 24.3 | 26.5 | 31.0 | 39.0 | 10.0 | 19.5 |
| Percent increase in scorch delay | | | 11.0 | 0 | 18.0 | 29.0 | 50.0 | 45.0 | | 95.0 |
| Rheometer at 153° C.: | | | | | | | | | | |
| R.M.T | 50.8 | 49.3 | 50.0 | 50.0 | 48.0 | 48.2 | 46.6 | 45.5 | 49.5 | 45.2 |
| $t_3$ | 12.0 | 9.8 | 14.0 | 9.6 | 11.5 | 12.0 | 13.8 | 15.6 | 5.7 | 9.0 |
| $t_{90}$ | 21.7 | 18.0 | 24.0 | 19.0 | 20.0 | 21.2 | 22.5 | 25.3 | 12.7 | 16.0 |

Vultrol, the known inhibitor, shows a mere 11% increase in scorch delay with Santocure MOR and no increased delay with Santocure NS. But the compound of our invention, at the same concentrations, shows a 45% increase in scorch delay with Santocure MOR and a 50% increase with Santocure NS in styrene-butadiene rubber.

Table IV shows the premature vulcanization inhibitor properties of N-(phenylthio)succinimide in natural rubber when a peroxide vulcanizing agent is used, N-(phenylthio)succinimide shows a 57% increase in scorch delay with the vulcanizing agent dicumyl peroxide. The masterbatch for Table IV is composed of:

| | Parts |
|---|---|
| Smoked sheets | 100 |
| High abrasion furnace black | 50 |
| Zinc oxide | 5 |
| Stearic acid | 3 |
| Hydrocarbon softener | 10 |
| Total parts | 168 |

TABLE IV

| | | |
|---|---|---|
| Masterbatch | 168 | 168 |
| N-1,3-dimethylbutyl-N'-phenyl-p-phenylenediamine | 1.5 | 1.5 |
| Dicumyl peroxide | 2.0 | 2.0 |
| N-(phenylthio)succinimide | | 1.0 |
| Mooney scorch at 135° C.: $t_5$ | 4.9 | 7.7 |
| Percent increase in scorch delay | | 57 |

Table V shows the results of tests on N-(phenylthio)succinimide, N-(t-butylthio)phthalimide, N,N'-di(phenylthio)urea, 1,3-bis(phenylthio)-2-imidazolinone and N-(phenylthio)maleimide as premature vulcanization inhibitors in rubber. N-(phenylthio)maleimide gives a 174% increase in scorch delay over the control. The rubber mixture of the test is an A-6 masterbatch. An A-6 masterbatch is composed of the following.

| | Parts |
|---|---|
| Smoked sheets | 100 |
| High abrasion furnace black | 50 |
| Zinc oxide | 5 |
| Stearic acid | 3 |
| Hydrocarbon softener | 10 |
| Total parts | 168 |

All stocks contain three parts Santoflex 77, 0.5 part Santocure MOR, and 2.5 parts sulfur.

TABLE V

| | | | | | | |
|---|---|---|---|---|---|---|
| A-6 masterbatch | 168 | 168 | 168 | 168 | 168 | 168 |
| N-(phenylthio)succinimide | | 1.0 | | | | |
| N-(t-butylthio)phthalimide | | | 1.0 | | | |
| N,N'-di(phenylthio)urea | | | | 1.0 | | |
| 1,3-bis(phenylthio)-2-imidazolidinone | | | | | 1.0 | |
| N-(phenylthio)maleimide | | | | | | 1.0 |
| Mooney scorch at 121° C.: $t_5$ | 24.5 | 47.7 | 28.1 | 52.0 | 55.0 | 67.2 |
| Percent increase in scorch delay | | 98.0 | 17.0 | 112.0 | 124.0 | 174.0 |
| Rheometer at 144° C.: | | | | | | |
| R.M.T | 67.3 | 66.0 | 56.7 | 68.0 | 66.7 | 59.8 |
| $t_3$ | 9.0 | 14.5 | 10.8 | 16.5 | 16.5 | 19.0 |
| $t_{90}$ | 21.5 | 27.4 | 34.2 | 29.2 | 29.2 | 33.0 |

Comparable results are obtained when the accelerator Santocure NS and the antidegradant N-1,3-dimethylbutyl-N'-phenyl-p-phenylenediamine or a mixture of this antidegradant and Santoflex 77 are used. Table VI shows N-(phenylthio)maleimide as a scorch inhibitor in a B-5 masterbatch of styrene-butadiene rubber.

TABLE VI

| | | | | |
|---|---|---|---|---|
| B-5 masterbatch | 211 | 211 | 211 | 211 |
| Thiofide | 1.4 | 1.4 | | |
| DPG | 0.7 | 0.7 | | |
| Santocure NS | | | 1.4 | 1.4 |
| N-(phenylthio)maleimide | | 1.0 | | 1.0 |
| N-1, 3-dimethylbutyl-N'-phenyl-p-phenylenediamine | 2 | 2 | 2 | 2 |
| Sulfur | 1.7 | 1.7 | 1.7 | 1.7 |
| Mooney scorch at 135° C | 10.4 | 22.8 | 22.8 | 41.8 |
| Percent increase in scorch delay | | 119 | | 83 |
| Rheometer at 153° C.: | | | | |
| R.M.T | 53.7 | 45.4 | 53.0 | 47.0 |
| $t_2$ | 5.1 | 9.5 | 10.2 | 15.5 |
| $t_{90}$ | 12.2 | 18.0 | 20.7 | 29.0 |

1,3-bis(phenylthio)-2-benzimidazolinone, N-(phenylthio)succinimide and 1,3-bis(trichloromethylthio)-2-benzimidazolinone are premature vulcanization inhibitors in cis-4-polybutadiene as shown in Table VII. 1,3-bis(phenylthio)-2-benzimidazolinone shows a 47% increase in scorch delay, N-(phenylthio)succinimide shows a 31% increase, and 1,3-bis(trichloromethylthio)-2-benzimidazolinone shows a 14% increase in cis-4-polybutadiene. The masterbatch for Table VII is composed of:

| | Parts |
|---|---|
| Cis-4-polybutadiene | 100 |
| Aromatic extender and process oil | 8 |
| Stearic acid | 2 |
| Santoflex 77 | 3 |
| Zinc oxide | 3 |
| Intermediate super abrasion furnace black | 50 |

TABLE VII

| | | | | |
|---|---|---|---|---|
| Masterbatch | 166 | 166 | 166 | 166 |
| 1,3-bis(trichloromethylthio-2-benzimidazolinone | | 1.0 | | |
| N-(phenylthio)succinimide | | | 1.0 | |
| 1, 3-bis (phenylthio)-2-benzimidazolinone | | | | 1.0 |
| Santocure MOR | 0.6 | 0.6 | 0.6 | 0.6 |
| Sulfur | 2.4 | 2.4 | 2.4 | 2.4 |
| Mooney scorch at 135° C.: $t_5$ | 15.5 | 17.7 | 20.3 | 22.8 |
| Percent increase in scorch delay | | 14 | 31 | 47 |
| Rheometer at 153° C.: | | | | |
| R.M.T | 58.0 | 78.0 | 61.2 | 57.2 |
| $t_2$ | 7.6 | 8.3 | 8.6 | 9.8 |
| $t_{90}$ | 15.7 | 19.0 | 17.5 | 18.2 |

1,3-bis(phenylthio)-2-benzimidazolinone and N-(phenylthio)succinimide are premature vulcanization inhibitors in ethylene-propylene terpolymer as shown in Table VIII. Ethylene-propylene terpolymer is the recognized and commonly used name for the polymerized product from the polymerization of ethylene propylene and a small quantity of a nonconjugated diene. The terpolymer reported in Table VIII is known commercially as "Nordel 1070." N-(phenylthio)succinimide shows a 28% increase in scorch delay and 1,3-bis(phenylthio)-2-benzimidazolinone shows an 80% increase when used as premature vulcanization inhibitors in ethylene-propylene terpolymer. The masterbatch of Table VIII is composed of:

| | Parts |
|---|---|
| Ethylene-propylene terpolymer | 100 |
| High abrasion furnace black | 80 |
| Zinc oxide | 5 |
| Naphthenic-type oil plasticizer and softener | 40 |

TABLE VIII

| Masterbatch | 225 | 225 | 225 |
|---|---|---|---|
| Tetramethyl thiuram monosulfide | 1.5 | 1.5 | 1.5 |
| Mercaptobenzothiazole | 0.5 | 0.5 | 0.5 |
| N-(phenylthio)succinimide |  | 1.0 |  |
| 1,3-bis(phenylthio)benzimidazolinone |  |  | 1.0 |
| Sulfur | 1.5 | 1.5 | 1.5 |
| Mooney scorch at 135° C.: $t_5$ min | 10.9 | 14.9 | 20.5 |
| Percent increase in scorch delay |  | 28 | 80 |
| Rheometer at 100° C.: |  |  |  |
| R.M.T. | 63.5 | 60.0 | 58.0 |
| $t_2$ | 4.6 | 6.0 | 7.5 |
| $t_{90}$ | 11.7 | 15.2 | 17.5 |

N-phenyl-N'-(phenylthio)urea was tested in an A-6 masterbatch as a premature vulcanization inhibitor and shows a 97% increase in scorch delay over the control. The results are reported in Table IX.

TABLE IX

| A-6 masterbatch | 168 | 168 |
|---|---|---|
| Sulfur | 2.5 | 2.5 |
| Santocure MOR | 0.5 | 0.5 |
| Santoflex 77 | 3.0 | 3.0 |
| N-phenyl-N'-(phenylthio)urea |  | 1.0 |
| Mooney scorch at 121° C.: $t_5$ min | 23.5 | 46.3 |
| Percent increase in scorch delay |  | 97 |

Comparable results are obtained when the other unsymmetrical ureas of the invention are tested as premature vulcanization inhibitors.

Table X shows that 1,4,5,6,7,7-hexachloro-N-(trichloromethylthio)bicyclo-[2.2.1]-hept-5-ene-2,3-dicarboximide and 1,3-bis(trichloromethylthio)-5,6-dichloro-2-benzimidazolinone are effective premature vulcanization inhibitors.

TABLE X

| A-1 masterbatch | 161 | 161 | 161 |
|---|---|---|---|
| Santocure MOR | 0.5 | 0.5 | 0.5 |
| Sulfur | 2.5 | 2.5 | 2.5 |
| 1,4,5,6,7,7-hexachloro-N-(trichloromethyl-thio)bicyclo[2.2.1]-hept-5-ene-2,3-dicarboximide |  | 1.0 |  |
| 1,3-bis(trichloromethylthio)-5,6-dichloro-2-benzimidazolinone |  |  | 1.0 |
| Mooney scorch at 121° C.: $t_5$ | 30.5 | 53.0 | 51.0 |
| Percent increase in scorch delay |  | 74.0 | 67.0 |
| Rheometer at 144° C.: |  |  |  |
| R.M.T. | 70.1 | 70.0 | 70.0 |
| $t_3$ | 7.9 | 12.0 | 12.2 |
| $t_{90}$ | 23.0 | 39.0 | 30.0 |

Table XI shows that N-[(trichloromethyl)thio]succinimide is a premature vulcanization inhibitor. With Santocure NS accelerator in the presence of the antidegradant N-1,3-dimethylbutyl-N'-phenyl-p-phenylenediamine, this inhibitor improves the scorch delay about 43%. Comparable results are obtained when this antidegradant is replaced with Santoflex 77.

TABLE XI

| Stock | 1 | 2 | 3 | 4 | 5 | 6 |
|---|---|---|---|---|---|---|
| A-1 masterbatch | 161 | 161 | 161 | 161 | 161 | 161 |
| Santocure NS | 0.5 | 0.5 | 0.5 | 0.5 |  |  |
| Santocure MOR |  |  |  |  | 0.5 | 0.5 |
| Sulfur | 2.5 | 2.5 | 2.5 | 2.5 | 2.5 | 2.5 |
| N-[(trichloromethyl)thio]succinimide |  | 1.0 |  | 1.0 |  | 1.0 |
| N-1,3-dimethylbutyl-N'-phenyl-p-phenylenediamine |  |  | 3.0 | 3.0 |  |  |
| Mooney scorch at 121° C.: $t_5$ | 28.8 | 33.0 | 27 | 38.5 | 32.7 | 47 |
| Percent increase in scorch delay |  | 14 |  | 43 |  | 43 |
| Rheometer at 144° C.: |  |  |  |  |  |  |
| R.M.T. | 76.3 | 71.5 | 73.8 | 76.9 | 71.0 | 77.8 |
| $t_3$ | 9.5 | 11.5 | 8.8 | 11.0 | 8.7 | 12.8 |
| $t_{90}$ | 23 | 45 | 21.5 | 32.3 | 21 | 39 |

Table XII shows that the compounds 1,3-bis(trichloromethylthio)-2-benzimidazolinone, N-[(trichloromethyl)thio]-4-cyclohexene-1,2-dicarboximido, 5,5-dimethyl-3-[(trichloromethyl)thio]hydantoin, and N-[(trichloromethyl)thio]maleimide are premature vulcanization inhibitors. In addition to the activity these compounds exhibit as premature vulcanization inhibitors, the rheometer tracings show that the rate of reversion during overcure of natural rubber is reduced.

TABLE XII

| Stock | 1 | 2 | 3 | 4 | 5 |
|---|---|---|---|---|---|
| A-1 masterbatch | 161 | 161 | 161 | 161 | 161 |
| Santoflex 77 | 3 | 3 | 3 | 3 | 3 |
| Santocure MOR | 0.5 | 0.5 | 0.5 | 0.5 | 0.5 |
| Sulfur | 2.5 | 2.5 | 2.5 | 2.5 | 2.5 |
| N-[(trichloromethyl)thio]-4-cyclohexene-1,2-dicarboximide |  | 1.0 |  |  |  |
| 5,5-dimethyl-3-[(trichloromethyl)-thio]hydantoin |  |  | 1.0 |  |  |
| N-[(trichloromethyl)thio]-maleimide |  |  |  | 1.0 |  |
| 1,3-bis(trichloromethylthio)-2-benzimidazolinone |  |  |  |  | 1.0 |
| Mooney scorch at 121° C.: $t_5$ | 18.3 | 30.8 | 34.3 | 30.0 | 39.4 |
| Percent increase in scorch delay |  | 68.0 | 87.0 | 64.0 | 115.0 |
| Rheometer at 144° C.: |  |  |  |  |  |
| R.M.T. | 74.9 | 76.5 | 79.3 | 75.5 | 82.5 |
| $t_3$ | 6.8 | 9.0 | 10.5 | 9.9 | 12.6 |
| $t_{90}$ | 17.5 | 18.7 | 20.6 | 23.0 | 23.0 |

A material composed of N-[(trichloromethyl)thio]-4-cyclohexene-1,2-dicarboximide, 50% active on an inert clay filler, shows comparable results to the compound per se when tested as a premature vulcanization inhibitor.

Tables XIII and XIV show that the compound N-(cyclohexylthio)glutarimide, N-(cyclohexylthio)-3,3-dimethylglutarimide, and N-(phenylthio)benzamide are premateur vulcanization inhibitors. The compounds are tested in a masterbatch composed of:

| | Parts |
|---|---|
| Smoked sheets | 100 |
| Intermediate super abrasion furnace black | 45 |
| Zinc oxide | 3 |
| Stearic acid | 2 |
| Aromatic oil plasticizer | 5 |

TABLE XIII

| Stock | 1 | 2 | 3 |
|---|---|---|---|
| Masterbatch | 155 | 155 | 155 |
| Sulfur | 2.5 | 2.5 | 2.5 |
| Santocure MOR | 0.5 | 0.5 | 0.5 |
| N-1,3-dimethylbutyl-N'-phenyl-p-phenylenediamine | 2.0 | 2.0 | 2.0 |
| N-(cyclohexylthio)glutarimide |  | 1.0 |  |
| N-(phenylthio)benzamide |  |  | 1.0 |
| Mooney scorch at 121° C.: $t_5$ | 35.2 | 85.8 | 85.3 |
| Percent increase in scorch delay |  | 144 | 144 |
| Rheometer at 144° C.: |  |  |  |
| R.M.T. | 61.0 | 61.2 | 63.8 |
| $t_2$ | 8.7 | 21.3 | 20.2 |
| $t_{90}$ | 27.7 | 42.1 | 39.0 |

TABLE XIV

| Stock | 1 | 2 |
|---|---|---|
| Masterbatch | 155 | 155 |
| Santocure NS | 0.5 | 0.5 |
| Sulfur | 2.5 | 2.5 |
| N-1,3-dimethylbutyl-N'-phenyl-p-phenylenediamine | 2.0 | 2.0 |
| N-(cyclohexylthio)-3,3-dimethylglutarimide |  | 0.5 |
| Mooney scorch at 121° C.: $t_5$ | 27.6 | 60.5 |
| Percent increase in scorch delay |  | 120.0 |
| Rheometer at 144° C.: |  |  |
| R.M.T. | 69.3 | 67.2 |
| $t_2$ | 8.9 | 17.2 |
| $t_{90}$ | 25.4 | 36.5 |

Table XV illustrates the use of 1,3-bis(cyclohexylthio)-2-imidazolidinone, 1,3-bis(cyclohexylthio)hydantoin, and 1-cyclohexylthio-2-imidazolidinone in a natural rubber masterbatch composed of the following:

| | Parts |
|---|---|
| Natural rubber | 100 |
| Intermediate super abrasion furnace black | 45 |
| Stearic acid | 2.0 |
| Hydrocarbon softener | 5.0 |
| Sulfur | 2.5 |
| Santocure MOR | 0.5 |
| Antidegradant | 2.0 |
| Zinc oxide | 3.0 |

TABLE XV

| Control | | | | |
|---|---|---|---|---|
| 1,3-bis(cyclohexylthio)-2-imidazolidinone | 1.0 | | | |
| 1-cyclohexylthio-2-imidazolidinone | | 1.0 | | |
| 1,3-bis(cyclohexylthio)hydantoin | | | 1.0 | |
| Mooney scorch at 121° C.:$t_5$ | 23.5 | 66.2 | 58.5 | 94.9 |
| Percent increase in scorch delay | | 182.0 | 149.0 | 336.0 |
| Rheometer at 144° C.: | | | | |
| R.M.T | 56.5 | 58.8 | 61.5 | 57.0 |
| $t_2$ | 7.0 | 15.0 | 15.0 | 22.0 |
| $t_{90}$ | 18.7 | 35.2 | 31.8 | 38.0 |

Table XVI shows that comparable results are obtained when the imide moiety is benzimidazolinon-1-yl, benzothiazolinon-1-yl, or benzoxazolinon-1-yl, and that good results are obtained when the imide moiety is 5,5-diphenyl-3-hydantoinyl.

The control stock (1) is stock A of Table I, supra, to which is added 1 part of prevulcanization inhibitor as follows:

Stock No.:
1. ------ None.
2. ------ 3-(trichloromethylthio)-5,5-diphenyl hydantoin.
3. ------ 3-trichloromethyl-2-benzothiazolinone.
4. ------ 1-trichloromethylthio-2-benzimidazolinone.
5. ------ 3-trichloromethylthio-2-benzoxazolinone.

The results for Stock No. 1 are the average values obtained from three separately prepared samples.

TABLE XVI

| Stock | 1 | 2 | 3 | 4 | 5 |
|---|---|---|---|---|---|
| Mooney scorch at 121° C.: | | | | | |
| $t_5$ | 22.1 | 37.5 | 30.8 | 31.1 | 32.1 |
| $t_{35-5}$ | 3.4 | 3.8 | 2.3 | 3.7 | 2.6 |

The imide moiety may, of course, be formed from two independent radicals as in $(A)_2N-SR$ where A is acyl derived from a carboxylic acid and R is alkyl, cycloalkyl, or aryl. A is, for example,

where R is alkyl, cycloalkyl, or aryl. Similarly, —SR may be the substituent of a simple amide as in

illustrated in Table XIII or two —SR substituents may be present as in $AN-(SR)_2$. Table XVII shows the curing characteristics determined by means of the Rheometer with a stock containing $AN-(SR)_2$. The control stock (1) is Stock A of Table I, supra, to which is added 1 part by weight of prevulcanization inhibitor as follows:

Stock:        Prevulcanization inhibitor
1 ---------------------------------- None
2 ---------------------------------- ($^1$)

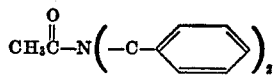

TABLE XVII

| Stock | 1 | 2 |
|---|---|---|
| Rheometer at 144° c.: | | |
| $t_2$ | 7.2 | 15.5 |
| $t_{90}$ | 18.0 | 27.2 |
| R.M.T | 54.9 | 56.3 |
| $k_2$ | .183 | .187 |

Comparable results to those in the tables, supra, illustrating utility are obtained with the inhibitors of this invention which are not illustrated.

Concentration studies show the inhibitors of this invention are effective in rubber at concentrations of 0.05 to 5.0 parts per hundred. Concentrations from 0.10 to 3.0 parts per hundred are preferred.

A wide variety of combinations of Santocure NS and N-(phenylthio)succinimide show storage stability in an eight-week oven aging test at 50° C. These combinations are improved vulcanization accelerators in rubber whereby premature vulcanization is effectively inhibited. Effective inhibitor concentrations for the combinations range from 1 to 9 parts of inhibitor. Comparable results are obtained when other accelerator and inhibitor combinations of this invention are tested for stability.

From the foregoing description, it will be appreciated that in the formula

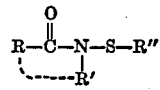

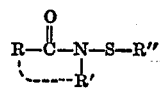

can be a radical derived by removal of hydrogen from an imide of a dicarboxylic acid. The term "imide of a dicarboxylic acid" is used in a configurational sense to indicate two carbonyls joined to a single nitrogen, although more than one such configuration may be present in the same molecule. For example, the mono- and diimides of benzene tetracarboxylic acid are regarded in the present specification and claims as imides of dicarboxylic acids. The hydrantoins, uracil, and parabanic acid also fall into the category of imides of dicarboxylic acid. The cyclic ureas, by which are meant monocarbonyl cyclic ureas as distinguished from cyclic ureas containing two carbonyls joined to a single nitrogen, present a configuration the reverse of imides of dicarboxylic acids in that only a single carbonyl is present and is joined to two nitrogen atoms. The preferred radicals conforming to

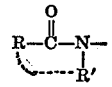

are derived from azoles. By azoles are meant the general class of pentatomic heterocyclic ring compounds whether or not unsaturation is present in the ring. Both the imides of dicarboxylic acids and cyclic ureas include pentatomic heterocyclic ring compounds. Other suiatble radicals are derived from monocarbonyl azoles containing one nitrogen atom and one other different hetero atom, for example, sulfur or oxygen, in the ring.

The radicals derived by removal of hydrogen from an imide of a dicarboxylic acid include, for example,

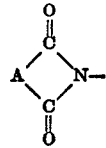

where A is a divalent aliphatic, cycloaliphatic, or aromatic radical. Thus, A is alkylene, cycloalkylene, alkenylene, cycloalkenylene, or arylene. Alkylene radicals belong to the series $-C_nH_{2n}-$. Alkenylene radicals are olefinically unsaturated aliphatic divalent radicals having the valence on separate carbon atoms, for example, propenylene $-CH_2CH=CH-$. The corresponding cyclic forms are cycloalkylene, for example, cyclohexylene $-C_6H_{10}-$ and cycloalkenylene, for example, cyclohexenylene $-C_6H_8-$. The divalent aromatic radicals are arylene radicals, for example, phenylene. The radicals derived by removal of hydrogen from a monocarbonyl cyclic urea include, for example,

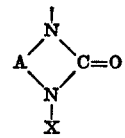

where A has the same meaning as before and X is hydrogen, alkyl, aryl, cycloalkyl, or SR'', R'' being alkyl, aryl, or cycloalkyl.

Suitable acyclic ureas may be represented by the formula $$X-N(Y)-\overset{O}{\underset{\|}{C}}-N(Z)-SR''$$

where X, Y, and Z individually are hydrogen, R'', or SR'', R'' being alkyl, aryl, or cycloalkyl as before.

The special case wherein an imido radical is formed from two independent acyl radicals and amide derivatives comprise other valuable classes which may both be represented by the formula $$(R''-\overset{O}{\underset{\|}{C}}-)_n N(-SR'')_{n'}[X]_{n''}$$

where n, n', and n'' are integers, the sum of which is three, n and n' being one or two, and n'' being zero or one, and R'' and X having the same meaning as before.

It is intended to cover all changes and modifications of the examples of the invention herein chosen for purposes of disclosure which do not constitute departures from the spirit and scope of the invention. The matter contained in each of the following claims is to be read as part of the general description of the present invention.

We claim:

1. A compound of the formula:

A—S—R wherein

A is selected from the group consisting of N-maleimidyl, 4 - cyclohexene-1,2-dicarboximid-N-yl, bicyclo(2.2.1)hept-5-ene-2,3-dicarboximid-N-yl, 7-oxabicyclo(2.2.1)heptane-2,3-dicarboximid-N-yl, 7 - oxabicyclo(2.2.1)hept-5-ene-2,3-dicarboximid-N-yl, alkylbicyclo(2.2.1)hept-5-ene-2,3-dicarboximid-N-yl, N-(arylthio) - 1,2,4,5-benzenetetracarboxylic-1,2:4,5-diimid-N'-yl, N-(alkylthio)-1,2,4,5-benzenetetracarboxylic - 1,2:4,5 - diimid-N'-yl, N-(cycloalkylthio) - 1,2,4,5-benzenetetracarboxylic-1,2:4,5-diimid-N'-yl, N-hexahydrophthalimidyl and N-succinimidyl and R is alkyl, aryl, cycloalkyl or benzyl, and wherein cycloalkyl, each occurrence, is cycloalkyl of 5 to 12 carbon atoms in the ring; alkyl, each occurrence, is alkyl of 1 to 20 carbon atoms and aryl, each occurrence, is phenyl, tolyl, ethylphenyl, isopropylphenyl, nitrophenyl, chlorophenyl, or naphthyl providing that R is cycloalkyl when A is N-succinimidyl.

2. A compound according to claim 1 where R is cycloalkyl of 5 to 8 carbon atoms.

3. A compound according to claim 1 wherein A is N-maleimidyl and R is cyclohexyl.

4. N-cyclohexylthio-4-cyclohexene-1,2-dicarboximide.

5. A compound according to claim 1 wherein A is N-hexahydrophthalimidyl and R is cyclohexyl.

6. A compound according to claim 1 wherein R is aryl.

7. A compound according to claim 1 wherein A is N-maleimidyl and R is phenyl.

8. A compound according to claim 1 wherein A is 4-cyclohexene-1,2-dicarboximid-N-yl and R is phenyl.

9. A compound according to claim 1 wherein R is alkyl of 1 to 12 carbon atoms.

10. A compound according to claim 9 wherein R is isopropyl, n-butyl, or n-dodecyl.

11. A compound according to claim 10 wherein A is N-maleimidyl and R is isopropyl.

12. A compound according to claim 10 wherein A is 4-cyclohexene-1,2-dicarboximid-N-yl and R is isopropyl.

13. A compound according to claim 1 of the formula

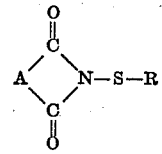

wherein A is ethylene and R is cycloalkyl of 5 to 8 carbon atoms.

14. A compound according to claim 13 wherein R is cyclohexyl.

15. A compound according to claim 1 of the formula A—S—R wherein A is selected from the group consisting of 4-cyclohexene-1,2-dicarboximid-N-yl, bicyclo(2.2.1)hept-5-ene-2,3-dicarboximid - N - yl, 7-oxabicyclo(2.2.1)heptane-2,3-dicarboximid-N-yl, 7-oxabicyclo(2.2.1)hept-5-ene-2,3,-dicarboximid-N-yl, alkylbicyclo(2.2.1)hept-5-ene-2,3-dicarboximid-N-yl, and N-hexahydrophthalimidyl and R is alkyl, aryl, cycloalkyl or benzyl and wherein cycloalkyl is cycloalkyl of 5 to 12 carbon atoms in the ring, alkyl is alkyl of 1 to 20 carbon atoms and aryl is phenyl, tolyl, ethylphenyl, isopropylphenyl, nitrophenyl, chlorophenyl or naphthyl.

16. A compound according to claim 15 wherein R is benzyl.

References Cited
UNITED STATES PATENTS

| | | | |
|---|---|---|---|
| 2,553,770 | 5/1951 | Kittleson | 260—326.5 S |
| 3,178,447 | 4/1965 | Kohn | 260—326.5 S |
| 3,285,929 | 11/1966 | Klauke et al. | 260—326.5 S |
| 3,499,030 | 3/1970 | Kuhle et al. | 260—326.5 S |
| 3,546,185 | 12/1970 | Coran et al. | 260—326.5 S |

ALEX MAZEL, Primary Examiner

J. TOVAR, Assistant Examiner

U.S. Cl. X.R.

260—82.1, 83.3, 83.5, 85.1, 85.3, 326.5 S